United States Patent [19]

Bowman

[11] 4,199,980
[45] Apr. 29, 1980

[54] FOLDED BEAM STRUCTURE UTILIZATION METHODS AND APPARATUS

[75] Inventor: Ronald Bowman, Laguna Beach, Calif.

[73] Assignee: Bell & Howell Company, Chicago, Ill.

[21] Appl. No.: 955,853

[22] Filed: Oct. 30, 1978

[51] Int. Cl.² ............................................. G01L 5/00
[52] U.S. Cl. ................................... 73/141 A; 73/727; 335/4
[58] Field of Search ................. 73/720, 721, 726, 727, 73/746, 777, 849, 141 A; 338/4, 5

[56] References Cited

U.S. PATENT DOCUMENTS

| 2,859,613 | 11/1958 | Green | 338/5 |
|---|---|---|---|
| 3,222,628 | 12/1965 | Pien | 338/4 |
| 3,341,796 | 9/1967 | Eisele | 338/5 |
| 3,365,689 | 1/1968 | Kutsay | 73/141 A |
| 3,377,866 | 4/1968 | Flavin | 73/726 |
| 3,433,064 | 5/1969 | Jacobsom | 73/141 A |
| 3,484,732 | 12/1969 | Postma | 338/4 |
| 3,537,318 | 11/1970 | Helin | 73/726 |
| 3,553,625 | 1/1971 | Stedman | 338/4 |
| 3,970,982 | 7/1976 | Kurtz et al. | 73/141 A |
| 4,051,451 | 9/1977 | Kurtz et al. | 73/141 A |

Primary Examiner—Donald O. Woodiel
Attorney, Agent, or Firm—Benoit Law Corporation

[57] ABSTRACT

A force is translated into a pair of oppositely acting moments or electric signals up to a limited magnitude of that force by means of a folded beam structure which has a first leg presenting a first end of the folded beam structure, and a second leg, shorter than the first leg, presenting a second end of the beam structure. The first end is maintained relatively stationary and the force to be transduced is applied to the second end of the folded beam structure. The second leg is thereby moved with the applied force and there is thus applied on the first leg a first moment acting in a first portion of the first leg on one side of the second end and a second moment acting oppositely to the first moment in a second portion of the first leg on another side of the second end. According to the invention, overloading of the first leg is prevented by limiting the travel of the second leg against movement of that second leg by the applied force.

44 Claims, 4 Drawing Figures

FOLDED BEAM STRUCTURE UTILIZATION METHODS AND APPARATUS

BACKGROUND OF THE INVENTION

1. Field of the Invention

The subject invention relates to force translating and transducing systems and, more specifically, to methods and apparatus for transducing forces into electric signals.

2. Prior-Art Statement

By way of background, beam transducers are known which employ cantilever structures including thin, delicate pieces of silicon. As apparent from U.S. Pat. Nos. 3,970,982 and 4,051,451, flexible C-shaped members of relatively thin material are employed to transmit forces to the silicon beam. A gross stop member is employed opposite the force transmitting member in the path of the silicon beam as an overload protection.

In practice, it would frequently be desirable to omit the thin, flexible C-shaped member for a tighter coupling of the transducer membrane to the silicon beam. However, this would introduce a non-linear response and potential breakage of the thin, delicate silicon beam in response to larger forces. On the other hand, retention of the thin, flexible force transmitting member would permit sufficient deflection of the transducer diaphragm for permanent deformation, unless a further stop were provided for the transducer diaphragm itself. In addition, the above mentioned gross stop technique introduces a considerable tolerance problem since any beam thickness tolerance may affect the actual amount of possible beam travel relative to the prior-art stop.

The mentioned cantilever beam design has the further disadvantage of providing on either of its two main surfaces only a compression area or then only a tension area at any instant in the operation of the transducer. For the generation of differential transducer signals, it would, therefore, be necessary to provide gage elements on both sides of the beam. In practice, it is, however, very difficult to diffuse gage elements on both sides of a beam of a material such as silicon. A known structure which provides both compression and tension areas on both main beam surfaces is the folded beam. As may, for instance, be seen from Crandall and Dahl, AN INTRODUCTION TO THE MECHANICS OF SOLIDS (McGraw-Hill, 1959), pp. 102 to 104, a folded beam structure is capable of providing oppositely acting moments of force on the same side of the main beam.

Unfortunately, conventional stop member techniques, such as shown in the above mentioned prior patents or in U.S. Pat. Nos. 3,341,796, 3,365,689, 3,377,866, 3,433,064 and 3,537,318 are useless in the cases of folded beam structues. In particular, and unlike a more conventional cantilever beam, an S-bend folded beam cannot be stopped by simply limiting movable end travel, because this would fail to restict torsion due to the folded beam couple. Also, fracture of the thin silicon beam would result if the stop were to contact the silicon beam at its center, or its end, or at any other location.

SUMMARY OF THE INVENTION

It is a general object of the subject invention to overcome the above mentioned disadvantages and to satisfy the needs implicit in the shortcomings of the prior-art.

It is a related object of this invention to provide improved methods and apparatus of translating a force into a pair of oppositely acting moments up to a limited magnitude of that force.

It is a germane object of the subject invention to provide improved methods and apparatus for transducing a force into electric signals.

It is a related object of this invention to provide improved methods and apparatus for providing electric signals in response to deflection of a membrane or diaphragm.

It is also an object of this invention to provide improved overload protection structure and techniques for folded beams.

Other objects of this invention will become apparent in the further course of this disclosure.

From a first aspect thereof, the subject invention resides in a method of translating a force into a pair of oppositely acting moments up to a limited magnitude of said force, comprising in combination the steps of providing a folded beam structure with a first leg presenting a first end of the folded beam structure, and a second leg shorter than the first leg and presenting a second end, spaced from the first end, of the folded beam structure, maintaining the first end stationary relative to said second end of the folded beam structure, applying the force to the second end of the folded beam structure, moving the second leg with the applied force and imposing on the first leg with the applied force and moving second leg a first moment acting in a first portion of the first leg on one side of the second end and a second moment acting oppositely to the first moment in a second portion of the first leg on another side of the second end, and preventing overloading of the first leg by providing a stop member in the path of travel of the second leg and out of any path of travel of the first leg limiting the travel of the second leg by having the second leg impinge on the stop member in response to an overload condition in the applied force.

From another aspect thereof, the subject invention resides in a method of transducing a force into electric signals and, more specifically, resides in the improvement comprising in combination the steps of providing a folded beam structure with a flexible first leg presenting a first end of the folded beam structure and a second leg shorter than the first leg and presenting a second end, spaced from the first end, of the folded beam structure, maintaining the first end stationary relative to the second end of the folded beam structure, applying the force to the second end of the folded beam structure, moving the second leg with the applied force and imposing on the first leg with the applied force and moving second leg oppositely acting first and second stresses, transducing the oppositely acting first and second stresses into electric signals indicative of the applied force, and preventing overloading of the flexible first leg by providing a stop member in the path of travel of the second leg and out of any path of travel of the first leg limiting the travel of the second leg by having the second leg impinge on the stop member in response to an overload condition in the applied force.

From another aspect thereof, the subject invention resides in a method of providing electric signals in response to deflection of a membrane, comprising in combination other steps of providing a folded beam structure with a flexible first leg presenting a first end of the folded beam structure and a second leg, shorter than the first leg, presenting a second end, spaced from the first end, of the folded beam structure, maintaining the first end stationary relative to the end of the folded beam structure, transmitting the membrane deflection to the second end of the folded beam structure, deflecting the second leg with the transmitted membrane deflection and imposing on the first leg with the deflecting second leg oppositely acting first and second stresses, transducing the oppositely acting first and second stresses into electric signals indicative of the membrane deflection, and preventing overloading of the flexible first leg and membrane by providing a stop member in the path of travel of the second leg and out of any path of travel of the first leg limiting the travel of the deflecting second leg by having the second leg impinge on the stop member in response to an overload condition.

From another aspect thereof, the subject invention resides in apparatus for translating a force into a pair of oppositely acting moments up to a limited magnitude of that force, comprising, in combination, a folded beam structure having a first leg providing a first end for the folded beam structure, and a second leg shorter than the first leg and providing a second end, spaced from the first end, for the folded beam structure, means connected to the first end for maintaining the first end stationary relative to the second end, means coupled to the second end for applying the force to the second end of the folded beam structure, for moving the second leg with the applied force and for imposing on the first leg with the applied force and moving second leg oppositely acting moments corresponding to the applied force, and means for preventing overloading of the first leg, including means adjacent to, and in the path of travel of the second leg and out of any path of travel of the first leg for limiting the travel of the second leg against movement of the second leg by the applied force.

From another aspect thereof, the subject invention resides in apparatus for transducing a force into electric signals and, more specifically, in the improvement comprising, in combination, a folded beam structure having a flexible first leg providing a first end for the folded beam structure, and a second leg shorter than the first leg and providing a second end, spaced from the first end, for the folded beam structure, means connected to the first end for maintaining the first end stationary relative to the second end of the folded beam structure, means coupled to the second end for applying the force to the second end of the folded beam structure for moving the second leg with the applied force and for imposing on the first leg with the applied force and moving second leg oppositely acting first and second stresses, means connected to the first leg for transducing the oppositely acting first and second stresses into electric signals indicative of the applied force, and means for preventing overloading of the flexible first leg, including means adjacent to, and in the course of travel of the second leg, and out of the course of travel of the first leg, for limiting the travel of the second leg against movement of the second leg by the applied force.

From another aspect thereof, the subject invention resides in apparatus for providing electric signals in response to deflection of a membrane and, more specifically, resides in the improvement comprising, in combination, a folded beam structure having a flexible first leg providing a first end for the folded beam structure, and a second leg shorter than the first leg and providing a second end, spaced from the first end, for the folded beam structure, means connected to the first end for maintaining the first end stationary relative to the second end of the folded beam structure, means coupled to the membrane and the second end for transmitting the membrane deflection to the second end of the folded beam structure, for deflecting the second leg with the transmitted membrane deflection and for imposing on the first leg with the deflecting second leg oppositely acting first and second stresses, means connected to the first leg for transducing the oppositely acting first and second stresses into electric signals indicative of the membrane deflection, and means for preventing overloading of the flexible first leg and membrane, including means adjacent to, and in the course of travel of the second leg, and out of the course of travel of the first leg, for limiting the travel of the deflecting second leg.

BRIEF DESCRIPTION OF THE DRAWINGS

The subject invention and its various aspects and objects will become more readily apparent from the following detailed description of preferred embodiments thereof, illustrated by way of example in the accompanying drawings, in which like reference numerals designate like or functionally equivalent parts, and in which.

DESCRIPTION OF PREFERRED EMBODIMENTS

Figure 1:
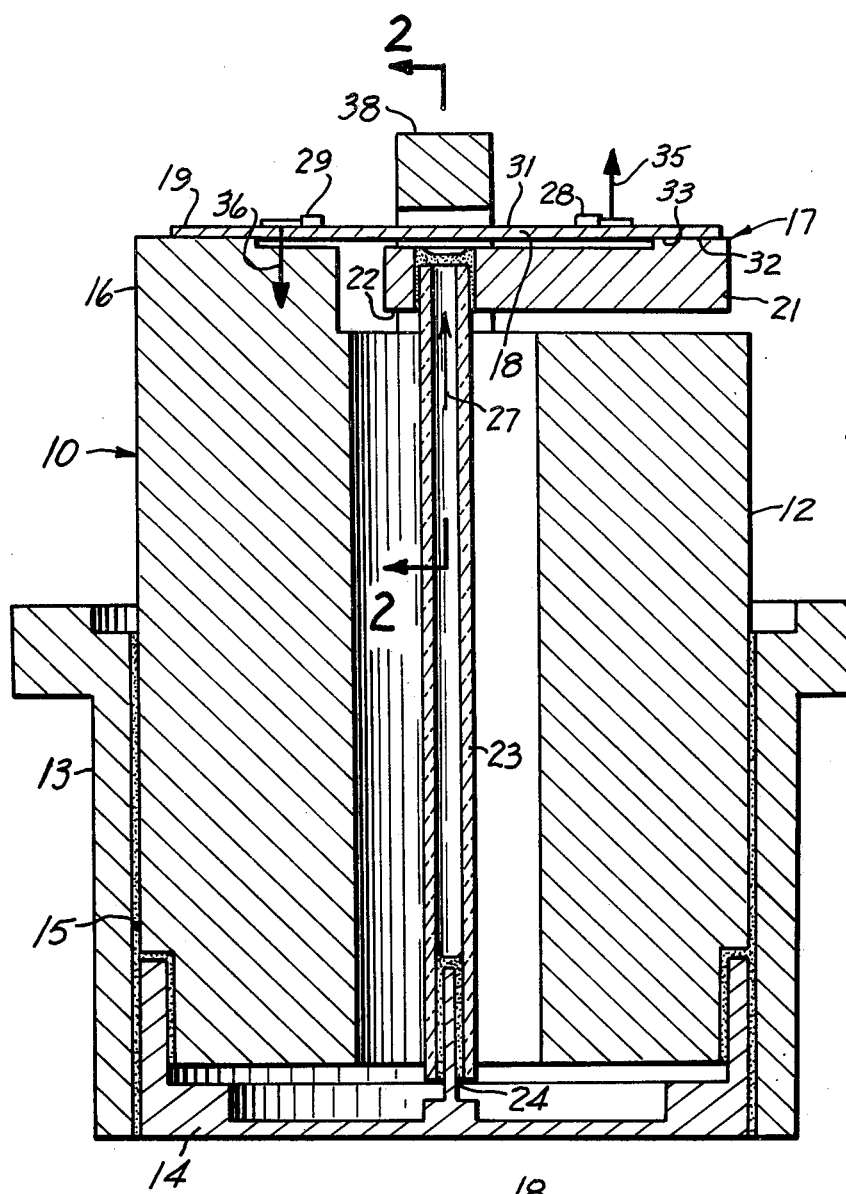
FIG. 1 is a longitudinal section through a transducer in accordance with a preferred embodiment of the subject invention.

The transducer 10 shown in FIGS. 1 to 4 has been basically designed as a blood pressure transducer, but obviously has various other medical or technological applications.

The transducer 10 has a case 12 made preferably in one piece from glass, ceramic, metal or another suitable material. Electrical insulators are preferred as housing material. In a prototype of the transducer 10, the component 12 is a one-piece glass case. The transducer also has a cover which houses the transducer components, and part of which has been shown at 13 in FIG. 1. A membrane or diaphragm 14, made preferably of a titanium alloy or other resilient material, is bonded to and spans the cross-section of the case 12 at one end thereof. The cover part 13, on the other hand, is bonded to the case 12 and diaphragm 14. By way of example, a blood compatible urethane bonding material 15 may be used for this purpose in the case of a blood pressure transducer.

Figure 4:
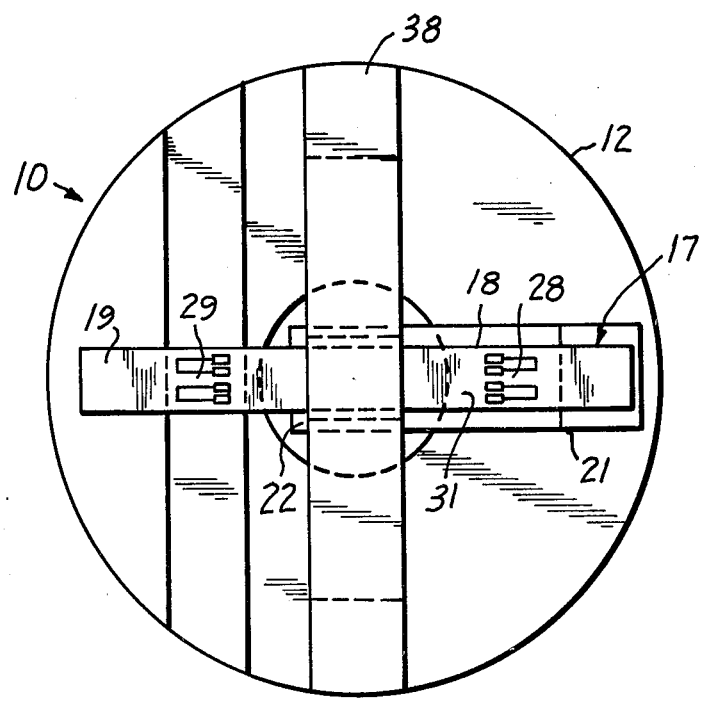
FIG. 4 is a top view of the transducer shown in FIGS. 1 and 2.

The case 12 has a projecting portion or mesa 16 for mounting a folded beam structure 17. The folded beam structure has a first leg 18 presenting a first end 19 of the folded beam structure, bonded to the case 12 at the mesa 16. The folded beam structure also has a second leg or coupler 21 which is shorter than the first leg 18 and which presents a second end 22 of the folded beam structure. The first and second ends 19 and 22 of the folded beam structure 17 are spaced from each other as seen in FIGS. 1 and 4.

The first end 19 of the folded beam structure 17 is maintained stationary relative to the second end 22 by its bonding or attachment to the case 12 at the mesa 16.

The primary actuating force is applied to the second end 22 of the folded beam structure. In particular, membrane deflections of the diaphragm 14, such as in response to pressure variations or other picked-up parameters, are transmitted to the second end 22 of the folded beam structure by a force rod 23 having one end coupled to the diaphragm at 24 and the other end coupled or bonded to the folded beam structure at 22. The force transmitting device 23 may be a tube or rod of rigid material, such as glass or metal. As indicated by an arrow 27 in FIG. 1, the force transmitted by the rod 23 is applied at the second end 22 of the folded beam structure perpendicularly to the second leg 21 in a direction toward the first leg 18. Strictly speaking, there may be some slight deviation from the perpendicular depending on the exact or instantaneous angular position of the second leg 21 or on its practical configuration. However, the expression "perpendicular" is herein employed to encompass the concept of "exactly or essentially perpendicular".

The first leg 18 of the folded beam structure according to the illustrated preferred embodiment constitutes the actual mechanical/electrical transducing element of the transducer 10. By way of example, the first leg 18 may be constituted by a thin, flexible silicon beam having diffused gage elements 28 and 29 located on one side 31 thereof.

The first end 19 of the silicon beam or first leg 18 constitutes the first end of the folded beam structure 17 which is bonded to the case 12 at the mesa 16. The second leg or coupler 21 is bonded at one end 32 to the second end 33 of the first leg or beam 18.

Figure 2:
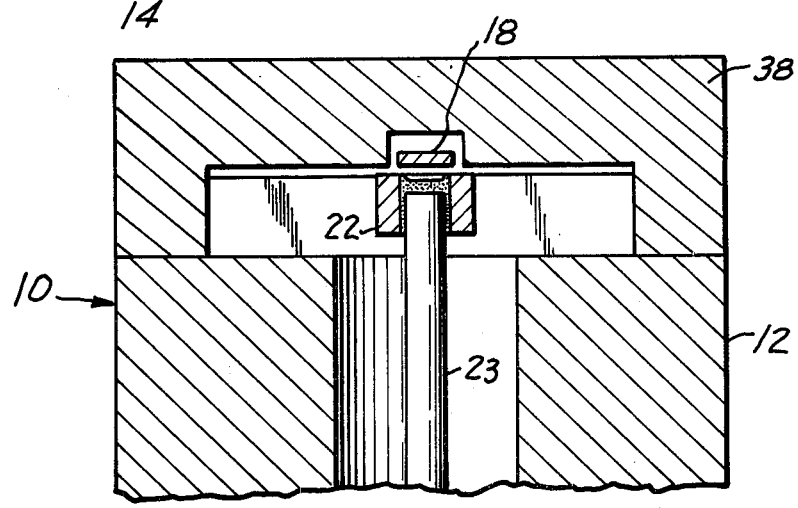
FIG. 2 is a partial section along the line 2—2 in FIG. 1.
Figure 3:
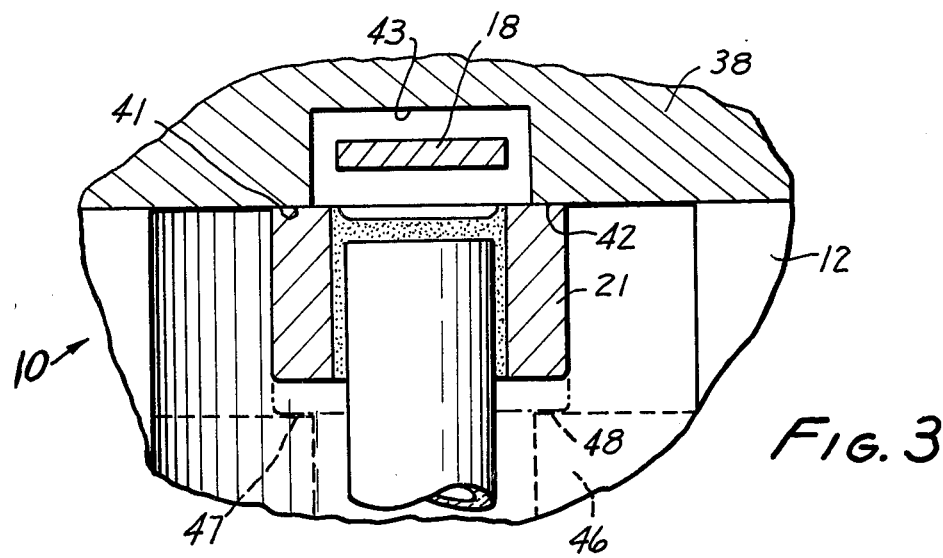
FIG. 3 is a view similar to FIG. 2, but on an enlarged scale, illustrating an overload condition of the transducer shown in FIGS. 1 and 2.

The first leg 18 is made more flexible than the second leg 21. To this end, the second leg 21 may be thicker than the first leg, as shown in FIGS. 1 to 3. Also, the second leg 21 may be made of glass or another material which is more rigid than the material of the beam 18.

As the above mentioned reference entitled AN INTRODUCTION TO THE MECHANICS OF SOLIDS shows in Example 3.7 and FIG. 3.18, application of a force to the coupler 21 results in the generation of a force couplet or pair of oppositely acting moments 35 and 36. In practice, the beam 18 thus assumes an S-shaped bend, subjecting the gage elements 28 to tension and the gage elements 29 to compression. The arrows 35 and 36 thus might be shown as pointing in opposite directions parallel to the beam 18 or its top surface 31. The oppositely acting simultaneous tension and compression in response to the input force 27 occurs on one and the same side 31 of the beam 18. This is of considerable practical significance, since it is technologically very difficult to diffuse gage elements on both sides of a silicon beam and since gage elements on only one side of a cantilever-type beam would not yield differential or opposing signals for driving a Wheatstone bridge or other differentially responding circuit.

Another advantage of the folded beam structure relative to a cantilever beam may be seen from a comparison of FIGS. 1 and 4 with the apparatus shown in the above mentioned U.S. Pat. Nos. 3,970,982 and 4,051,451. As seen from the latter patents, a cantilever beam can have an effective length which covers practically only a radius of the transducer casing, while the effective beam in a folded beam structure, such as the beam 18 in FIGS. 1 and 4, extends practically across the diameter of the transducer case 12.

Moreover, and as already mentioned above, the conventional stop member techniques shown in the prior-art references are not applicable to folded beam structures. In particular, an S-bend folded beam cannot be stopped by simply limiting movable end travel, since this would fail to restrict torsion due to the folded beam couple. Also, the thin silicon beam 18 would fracture if it were to contact a stop at its center, or its end, or at any other location.

According to the subject invention, this prior-art problem is solved by preventing overloading of the primary beam or first leg 18 by limiting the travel of the coupler or second leg 21 against movement of the second leg by the applied force 27. The travel of the second leg 21 is thus limited, preferably at the second end 22, in order to prevent overloading of the first leg or beam 18.

To this end, the first leg 18 is provided with a first width and the second leg 21 with a second width wider than the first width. The stop member is then structured and positioned to be avoided by the first width of the first leg 18, while being engaged by the second leg 21 with its larger second width.

The illustrated preferred embodiment thus includes a stop member or beam 38 which in effect is located in the path of travel of the second leg 21, while remaining out of any path of travel of the first leg 18, for limiting the travel of the second leg 21 against movement of that second leg by the applied force 27, while simultaneously limiting the travel of the first leg 18 without any engagement of that first leg by any stop member.

The stop member or beam 38 is bonded to the transducer case 12 as best seen in FIGS. 2 and 3. The stop member 38 has shoulder portions 41 and 42 with a groove 43 extending between those shoulder portions. The groove 43 is wider than the first width of the first leg or beam 18, but is narrower than the second width of the second beam 21 and is also deeper than any travel of the first leg 18 in the operation of the transducer 10. The first leg 18 extends in part through the groove 43, with the first width of the first leg 18 being located between the shoulder portions 41 and 42.

As seen in FIGS. 1 and 2, the first leg or beam 18 and the second leg or coupler 21 are sufficiently spaced from the stop member 38 to permit considerable travel of the beam 18 and coupler 21 in response to deflections of the diaphragm 14. The transducer 10 is thus capable of transducing input forces into pairs of oppositely directed electric signals over a considerable range. On the other hand, and as shown in FIG. 3, the second beam or coupler 21 impinges on the shoulder portions 41 and 42 of the stop member 38 in response to an overload condition. As also shown in FIG. 3, the delicate first beam 18 is still located at a safe distance from any part of the stop member 38, when the second beam 21 is stopped by impingement on the shoulder portions 41 and 42. The silicon beam 18 is thus well protected against breakage and torsion due to the folded beam coupler is restricted as well.

In addition, the construction and stopping technique of the illustrated preferred embodiment of the subject invention also protects the diaphragm or membrane 14 against overload conditions. In particular, when the stop member shoulder portions 41 and 42 restrict upward motion of the second beam 21, they also stop further upward motion of the coupling rod 23 and thus of the membrane 14. In this manner, the transducer diaphragm is protected against distortion from excessive pressure and similar influences. If desired, the transducer may practically in the same manner be protected against negative pressures or large vacua, by providing a stop member 46 with shoulder portions 47 and 48. As shown in FIG. 3, the second stop member 46 would be spaced from the first stop member 38 by an amount sufficient to permit travel of the second leg 21 between such first and second stop members throughout the intended range of response of the transducer 10.

In the illustrated preferred embodiment of the subject invention, the stop member 38 with shoulder portions 41 and 42 is located at the second end 22 of the folded beam structure 17, for stopping the travel of the second leg 21 at that second end. This constitutes the best mode presently contemplated for carrying out the subject invention.

It will thus be recognized that the subject invention meets all of its above mentioned objectives and provides an S-bend folded beam transducer that has utility in many applications where occasional overload conditions would render state-of-the-art equipment useless.

The principles of the subject invention are generally applicable to methods and apparatus for translating a force into a pair of oppositely acting moments including a first moment 35 acting in a first portion of the first leg 18 on one side of the second end 22 and a second moment 36 in a second portion of the first leg 18 on another side of the second end 22 of the folded beam structure, with overloading of the first leg 18 being prevented by limiting the travel of the second leg 21 against movement of that second leg by the applied force 27. These principles are also applicable to methods and apparatus for transducing a force into electric signals and to methods and apparatus for providing electric signals in response to deflection of a membrane or diaphragm 14.

In the latter case, membrane or diaphragm deflections are preferably transmitted to the second end 22 of the folded beam structure along a straight line, such as the longitudinal axis of the rod or tube 23, extending perpendicularly to the second leg 21. In all these instances, force transmission or translation to the first beam 18 proceeds only up to a limited magnitude, with the second beam 21 being restrained against excessive travel for an overload protection of the first beam 18 and, if desired, the membrane or diaphragm 14.

The present extensive disclosure will render apparent or suggest to those skilled in the art various modifications and variations within the spirit and scope of the subject invention.

I claim:

1. A method of translating a force into a pair of oppositely acting moments up to a limited magnitude of said force, comprising in combination the steps of:
   providing a folded beam structure with a first leg presenting a first end of the folded beam structure, and a second leg shorter than said first leg and presenting a second end, spaced from said first end, of the folded beam structure;
   maintaining said first end stationary relative to said second end of the folded beam structure;
   applying said force to said second end of the folded beam structure, moving said second leg with said applied force and imposing on said first leg with said applied force and moving second leg a first moment acting in a first portion of said first leg on one side of said second end and a second moment acting oppositely to said first moment in a second portion of said first leg on another side of said second end; and
   preventing overloading of said first leg by providing a stop member in the path of travel of said second leg and out of any path of travel of said first leg limiting the travel of said second leg by having said second leg impinge on said stop member in response to an overload condition in said applied force.

2. A method as claimed in claim 1, wherein:
   said force is applied at said second end perpendicularly to said second leg.

3. A method as claimed in claim 1, wherein:
   said force is applied at said second end perpendicularly to said second leg in a direction toward said first leg.

4. A method as claimed in claim 1, 2 or 3 wherein:
   said travel of the second leg is limited at said second end to prevent overloading of said first leg.

5. A method as claimed in claim 1, wherein:
   said first leg is made more flexible than said second leg.

6. A method as claimed in claim 5, wherein:
   said force is applied at said second end perpendicularly to said second leg.

7. A method as claimed in claim 5, wherein:
   said force is applied at said second end perpendicularly to said second leg in a direction toward said first leg.

8. A method as claimed in claim 5, 6 or 7 wherein:
   said travel of the second leg is limited at said second end to prevent overloading of said first leg.

9. A method of translating a force into a pair of oppositely acting moments up to a limited magnitude of said force, comprising in combination the steps of:
   providing a folded beam structure with a first leg presenting a first end of the folded beam structure, and a second leg shorter than said first leg and presenting a second end, spaced from said first end, of the folded beam structure;
   said first leg being provided with a first width;
   said second leg being provided with a second width wider than said first width;
   maintaining said first end stationary relative to said second end of the folded beam structure;
   applying said force to said second end of the folded beam structure, moving said second leg with said applied force and imposing on said first leg with said applied force and moving second leg a first moment acting in a first portion of said first leg on one side of said second end and a second moment acting oppositely to said first moment in a second portion of said first leg on another side of said second end; and
   preventing overloading of said first leg by providing a stop with shoulder portions and with a groove extending between said shoulder portions, being wider than said first width, narrower than said second width and deeper than a travel of said first leg, permitting said first leg to extend in part through said groove with said first width located between said shoulder portions, and stopping the travel of said second leg with said shoulder portions against movement of said second leg by said applied force.

10. A method as claimed in claim 9, wherein:
    said force is applied at said second end in a direction toward said first leg and perpendicularly to said second leg; and said stop with shoulder portions is located at said second end for stopping the travel of said second leg at said second end.

11. In a method of transducing a force into electric signals, the improvement comprising in combination the steps of:
providing a folded beam structure with a flexible first leg presenting a first end of the folded beam structure and a second leg shorter than the first leg and presenting a second end, spaced from said first end, of the folded beam structure;
maintaining said first end stationary relative to said second end of the folded beam structure;
applying said force to said second end of the folded beam structure, moving said second leg with said applied force and imposing on said first leg with said applied force and moving second leg oppositely acting first and second stresses;
transducing said oppositely acting first and second stresses into electric signals indicative of said applied force; and
preventing overloading of said flexible first leg by providing a stop member in the path of travel of said second leg and out of any path of travel of said first leg limiting the travel of said second leg by having said second leg impinge on said stop member in response to an overload condition in said applied force.

12. A method as claimed in claim 11, wherein:
said force is applied at said second end perpendicularly to said second leg.

13. A method as claimed in claim 11, wherein:
said force is applied at said second end perpendicularly to said second leg in a direction toward said first leg.

14. A method as claimed in claim 11, 12 or 13, wherein:
said travel of the second leg is limited at said second end to prevent overloading of said first leg.

15. In a method of transducing a force into electric signals, the improvement comprising in combination the steps of:
providing a folded beam structure with a flexible first leg presenting a first end of the folded beam structure and a second leg shorter than the first leg and presenting a second end, spaced from said first end, of the folded beam structure;
said first leg being provided with a first width;
said second leg being provided with a second width wider than said first width;
maintaining said first end stationary relative to said second end of the folded beam structure;
applying said force to said second end of the folded beam structure; moving said second leg with said applied force and imposing on said first leg with said applied force and moving second leg oppositely acting first and second stresses;
transducing said oppositely acting first and second stresses into electric signals indicative of said applied force; and
preventing overloading of said first leg by providing a stop with shoulder portions and with a groove extending between said shoulder portions, being wider than first width, narrower than said second width and deeper than a travel of said first leg, permitting said first leg to extend in part through said groove with said first width located between said shoulder portions, and stopping the travel of said second leg with said shoulder portions against movement of said second leg by said applied force.

16. A method as claimed in claim 15, wherein:
said force is applied at said second end in a direction toward said first leg and perpendicularly to said second leg; and
said stop with shoulder portions is located at said second end for stopping the travel of said second leg at said second end.

17. In a method of providing electric signals in response to deflection of a membrane, comprising in combination the steps of:
providing a folded beam structure with a flexible first leg presenting a first end of the folded beam structure and a second leg, shorter than the first leg, presenting a second end, spaced from the first end, of the folded beam structure;
maintaining said first end stationary relative to said second end of the folded beam structure;
transmitting said membrane deflection to said second end of the folded beam structure, deflecting said second leg with said transmitted membrane deflection and imposing on said first leg with said deflecting second leg oppositely acting first and second stresses;
transducing said oppositely acting first and second stresses into electric signals indicative of said membrane deflection; and
preventing overloading of said flexible first leg and membrane by providing a stop member in the path of travel of said second leg and out of any path of travel of said first leg limiting the travel of said deflecting second leg by having said second leg impinge on said stop member in response to an overload condition.

18. A method as claimed in claim 17, wherein:
said membrane deflection is transmitted to said second end along a straight line extending perpendicularly to said second leg.

19. A method as claimed in claim 17 or 18, wherein:
said travel of said deflecting second leg is limited at said second end of said folded beam structure.

20. In a method of providing electric signals in response to deflection of a membrane, comprising in combination the steps of:
providing a folded beam structure with a flexible first leg presenting a first end of the folded beam structure and a second leg, shorter than the first leg, presenting a second end, spaced from the first end, of the folded beam structure;
said first leg being provided with a first width;
said second leg being provided with a second width wider than said first width;
maintaining said first end stationary relative to said second end of the folded beam structure;
transmitting said membrane deflection to said second end of the folded beam structure, deflecting said second leg with said transmitted membrane deflection and imposing on said first leg with said deflecting second leg oppositely acting first and second stresses;
transducing said oppositely acting first and second stresses into electric signals indicative of said membrane deflection; and
preventing overloading of said flexible first leg and membrane by providing a stop with shoulder portions and with a groove extending between said shoulder portions, being wider than said first width, narrower than said second width and deeper than a second width of said first leg, permitting said first leg to extend in part through said groove with said first width located between said shoulder portions, and stopping the travel of said second leg with said shoulder portions against movement of said second leg by said applied force.

21. A method as claimed in claim 20, wherein:
said force is applied at said second end in a direction toward said first leg and perpendicularly to said second leg; and
said stop with shoulder portions is located at said second end for stopping the travel of said second leg at said second end.

22. Apparatus for translating a force into a pair of oppositely acting moments up to a limited magnitude of said force, comprising in combination:
a folded beam structure having a first leg providing a first end for the folded beam structure, and a second leg shorter than the first leg and providing a second end, spaced from said first end, for the folded beam structure;
means connected to said first end for maintaining the first end stationary relative to said second end;
means coupled to said second end for applying said force to the second end of the folded beam structure, for moving the second leg with said applied force and for imposing on the first leg with said applied force and moving second leg oppositely acting moments corresponding to said applied force; and
means for preventing overloading of said first leg, including means adjacent to, and in the path of travel of said second leg and out of any path of travel of said first leg for limiting the travel of the second leg against movement of the second leg by said applied force.

23. Apparatus as claimed in claim 22, wherein:
said force applying means include means for applying said force at said second end perpendicularly to said second leg.

24. Apparatus as claimed in claim 22, wherein:
said force applying means include means for applying said force at said second end perpendicularly to said second leg in a direction toward said first leg.

25. Apparatus as claimed in claim 22, 23 or 24, wherein:
said overload preventing means include means for limiting said travel of the second leg at said second end to prevent overloading of said first leg.

26. Apparatus as claimed in claim 22, wherein:
said first leg is more flexible than said second leg.

27. Apparatus as claimed in claim 26, wherein:
said force applying means include means for applying said force at said second end perpendicularly to said second leg.

28. Apparatus as claimed in claim 22, wherein:
said force applying means include means for applying said force at said second end perpendicularly to said second leg in a direction toward said first leg.

29. Apparatus as claimed in claim 26, 27 or 28, wherein:
said overload preventing means include means for limiting said travel of the second leg at said second end to prevent overloading of said first leg.

30. Apparatus for translating a force into a pair of oppositely acting moments up to a limited magnitude of said force, comprising in combination:
a folded beam structure having a first leg having a first width and providing a first end for the folded beam structure, and a second leg having a second width wider than said first width, being shorter than the first leg and providing a second end, spaced from said first end, for the folded beam structure;
means connected to said first end for maintaining the first end stationary relative to said second end;
means coupled to said second end for applying said force to the second end of the folded beam structure, for moving the second leg with said applied force and for imposing on the first leg with said applied force and moving second leg oppositely acting moments corresponding to said applied force; and
means for preventing overloading of said first leg having shoulder portions and a groove extending between said shoulder portions, being wider than said first width, narrower than said second width and deeper than the travel of said first leg, with said first leg extending in part through said groove with said first width located between said shoulder portions, and said shoulder portions being in the path of travel of said second leg, whereby said second leg is stopped by said shoulder portions.

31. Apparatus as claimed in claim 30, wherein:
said force applying means include means for applying said force at said second end in a direction toward said first leg and perpendicularly to said second leg; and
said means having shoulder portions are located at said second end in the path of travel of said second leg.

32. Apparatus as claimed in claim 30, wherein:
said first leg is more flexible than said second leg.

33. Apparatus as claimed in claim 32, wherein:
said force applying means include means for applying said force at said second end in a direction toward said first leg and perpendicularly to said second leg; and
said means having shoulder portions are located at said second end in the path of travel of said second leg.

34. In apparatus for transducing a force into electric signals, the improvement comprising in combination:
a folded beam structure having a flexible first leg providing a first end for the folded beam structure, and a second leg shorter than the first leg and providing a second end, spaced from said first end, for the folded beam structure;
means connected to said first end for maintaining said first end stationary relative to said second end of the folded beam structure;
means coupled to said second end for applying said force to said second end of the folded beam structure for moving said second leg with said applied force and for imposing on said first leg with said applied force and moving second leg oppositely acting first and second stresses;
means connected to said first leg for transducing said oppositely acting first and second stresses into electric signals indicative of said applied force; and
means for preventing overloading of said flexible first leg, including means adjacent to, and in the course of travel of said second leg, and out of the course of travel of said first leg, for limiting the travel of said second leg against movement of said second leg by said applied force.

35. Apparatus as claimed in claim 34, wherein:
said force applying means include means for applying said force at said second end perpendicularly to said second leg.

36. Apparatus as claimed in claim 34, wherein:
said force applying means include means for applying said force at said second end perpendicularly to said second leg in a direction toward said first leg.

37. Apparatus as claimed in claim 34, 35 or 36, wherein:
said overload preventing means include means for limiting said travel of the second leg at said second end to prevent overloading of said first leg.

38. In apparatus for transducing a force into electric signals, the improvement comprising in combination:
a folded beam structure having a flexible first leg having a first width and providing a first end for the folded beam structure, and a second leg having a second width wider than said first width, being shorter than the first leg and providing a second end, spaced from said first end, for the folded beam structure;
means connected to said first end for maintaining said first end stationary relative to said second end of the folded beam structure;
means coupled to said second end for applying said force to said second end of the folded beam structure for moving said second leg with said applied force and for imposing on said first leg with said applied force and moving second leg oppositely acting first and second stresses;
means connected to said first leg for transducing said oppositely acting first and second stresses into electric signals indicative of said applied force; and
means for preventing overloading of said flexible first leg having shoulder portions and a groove extending between said shoulder portions, being wider than said first width, narrower than said second width and deeper than the travel of said first leg, with said first leg extending in part through said groove with said first width located between said shoulder portions, and said shoulder portions being in the path of travel of said second leg, whereby said second leg is stopped by said shoulder portions.

39. Apparatus as claimed in claim 38, wherein:
said force applying means include means for applying said force at said second end in a direction toward said first leg and perpendicularly to said second leg; and
said means having shoulder portions are located at said second end in the path of travel of said second leg.

40. In apparatus for providing electric signals in response to deflection of a membrane, the improvement comprising in combination:
a folded beam structure having a flexible first leg providing a first end for the folded beam structure, and a second leg shorter than the first leg and providing a second end, spaced from the first end, for the folded beam structure;
means connected to said first end for maintaining said first end stationary relative to said second end of the folded beam structure;
means coupled to said membrane and said second end for transmitting said membrane deflection to said second end of the folded beam structure, for deflecting said second leg with said transmitted membrane deflection and for imposing on said first leg with said deflecting second leg oppositely acting first and second stresses;
means connected to said first leg for transducing said oppositely acting first and second stresses into electric signals indicative of said membrane deflection; and
means for preventing overloading of said flexible first leg and membrane, including means adjacent to, and in the course of travel of said second leg, and out of the course of travel of said first leg, for limiting the travel of said deflecting second leg.

41. Apparatus as claimed in claim 40, wherein:
said transmitting means include means coupled to said membrane and to said second end for transmitting said membrane deflection along a straight line extending perpendicularly to said second leg.

42. Apparatus as claimed in claim 40 or 41, wherein:
said overload preventing means include means for limiting said travel of said deflecting second leg at said second end of said folded beam structure.

43. In apparatus for providing electric signals in response to deflection of a membrane, the improvement comprising in combination:
a folded beam structure having a flexible first leg having a first width and providing a first end for the folded beam structure, and a second leg having a second width wider than said first width, being shorter than the first leg and providing a second end, spaced from the first end, for the folded beam structure;
means connected to said first end for maintaining said first end stationary relative to said second end of the folded beam structure;
means coupled to said membrane and said second end for transmitting said membrane deflection to said second end of the folded beam structure, for deflecting said second leg with said transmitted membrane deflection and for imposing on said first leg with said deflecting second leg oppositely acting first and second stresses;
means connected to said first leg for transducing said oppositely acting first and second stresses into electric signals indicative of said membrane deflection; and
means for preventing overloading of said flexible first leg and membrane having shoulder portions and a groove extending between said shoulder portions, being wider than said first width, narrower than said second width and deeper than the travel of said first leg, with said first leg extending in part through said groove with said first width located between said shoulder portions, and said shoulder portions being in the path of travel of said second leg, whereby said second leg is stopped by said shoulder.

44. Apparatus as claimed in claim 43, wherein:
said means having shoulder portions are located at said second end in the path of travel of said second leg.

* * * * *